2,796,078
WATER FOUNTAIN REGULATOR

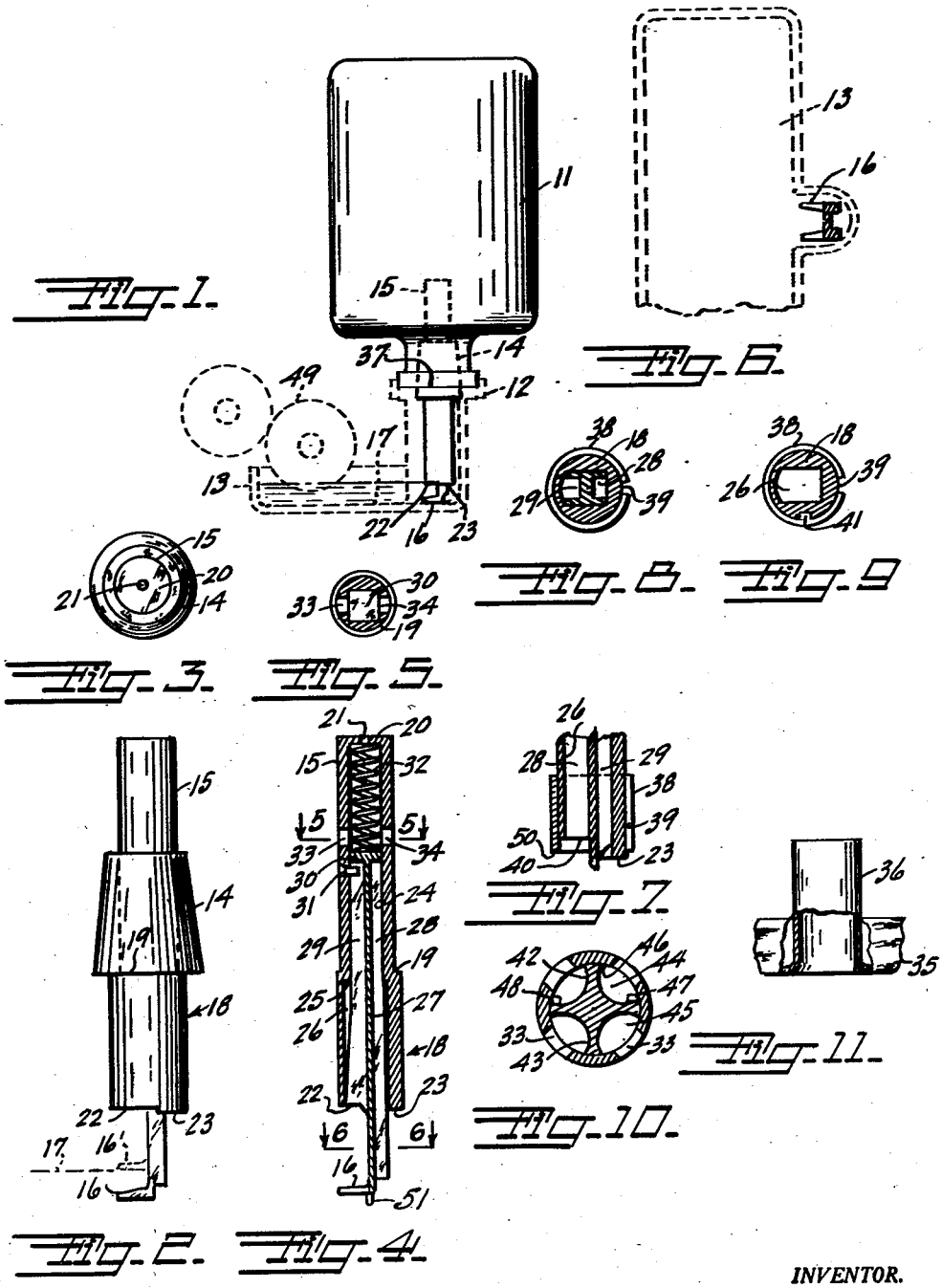

Benjamin S. Ebersole, San Francisco, Calif.

Application March 26, 1956, Serial No. 573,978

8 Claims. (Cl. 137—454)

This invention relates to improvements in means for maintaining a constant level of moistening fluid in the moistening tray or fountain of off-set printing presses or the like, and provides a water fountain regulator which will maintain a constant level within predetermined limits with no tendency to airlock because separate passages are provided for air and moistening fluid, with resulting continuous production of perfect impressions.

As is well known in the art of offset printing, the fountain roll must have a predetermined degree of immersion in the moistening fluid if the most perfect impressions are to be produced. An excessive degree of immersion will create faint or no impressions while a lesser degree of immersion will cause blurring, smudging, or even blocking of the image plate with resultant blurred, smudged, or blocked prints.

It is known that feeders have been provided for feeding moistening fluid to the fountain, but so far as known, they are provided with a single passage for both, air and water, consequently creating occasional airlock which results in termination of moistening fluid feed to the fountain until the airlock is disrupted, the moistening fluid in the fountain dropping below the minimum permissible level with resultant smudging of the impressions, and many impressions may be spoilt before the diminishing water level is noticed by the operator of the press.

My fountain regulator seals the water container when in normal upright position and also when inverted until the container is mounted on its support on the fountain, and thereafter will maintain the predetermined level within about 1/32 inch infallibly irrespective of use or evaporation of the moistening fluid in the fountain. Furthermore, this regulator is provided with means for compensating for different water levels required for different presses, as also for variations in the height of the support for the container, and for other conditions where a different moistening fluid level may be required or desirable.

The objects and advantages of the invention are as follows:

First, to provide a water fountain regulator for offset printing presses and similarly controlled water level regulation purposes, one which will maintain its water container sealed under both, upright and inverted positions, and automatically open the container to communication with the fountain when the container with its fountain regulator is placed in operative position on the fountain support.

Second, to provide a regulator which will maintain a substantially constant level of water in the fountain with variations between maximum and minimum permissible levels at an absolute minimum.

Third, to provide a regulator as defined which is free from any tendency to airlock and therefore positive in its regulated feed of water for maintaining a constant level.

Fourth, to provide a regulator as defined with an adjustable air inlet or lip for adjusting the level of the water in the fountain in accordance with requirements for producing perfect impressions from the image plate.

Fifth, to provide a regulator as defined which is of the simplest possible construction, economical to manufacture, easily and quickly assembled and disassembled, and positive in operation.

In describing the invention reference will be had to the accompanying drawings, in which:

Fig. 1 is an end elevation showing the fountain with fountain roller and container support in dotted outlines with the normal water level indicated, and showing the invention applied to a container mounted in operative position.

Fig. 2 is a side elevation of the regulator with the container closure applied thereto.

Fig. 3 is a top plan view of Fig. 2.

Fig. 4 is a side sectional elevation showing the control mechanism with the container closure removed.

Fig. 5 is a section taken on line 5—5 of Fig. 4.

Fig. 6 is a section taken on line 6—6 of Fig. 4, and showing the fountain in a dotted plan view with one end broken away.

Fig. 7 is an enlarged fragmentary vertical section through the adjusting means for adjusting the water level in the fountain.

Fig. 8 is a top plan view of Fig. 7 with the regulator housing shown in section.

Fig. 9 is a view similar to Fig. 8 but modified to include a key to maintain the lip adjusting member against rotative movement.

Fig. 10 is an enlarged sectional view of a modification of the invention showing a plurality of air and water passages.

Fig. 11 illustrates a modification of the closure means for the container.

The invention is used in connection with a suitable container such as a bottle 11, a support 12 being provided for the inverted bottle, and this support being integral with or attached to the fountain 13.

The invention is applied to the container when in its normal upright position, the cork being removed and replaced by the closure such as the stopper 14 which encompasses the upper portion 15 of the regulator, the foot 16 of the regulator resting on the bottom 17 of the tray or fountain. Thus, for operation it is merely necessary to replace the closure on the container of water with my invention, invert the container and place it on the support, as the regulator opens automatically when the container is placed in position.

The regulator includes a valve housing 18 which is reduced in diameter intermediate its height to form a shoulder 19 to function as a stop for the closure, the upper end being closed by the housing head 20 which is provided with a vent 21, the lower end being stepped as indicated at 22 and 23.

The interior of the housing includes the upperchamber 24 which is illustrated as substantially rectangular in cross-section from a point 25 just below the shoulder 19 to the head 20, the lower chamber being somewhat enlarged and also substantially rectangular in cross-section as indicated at 26. The rectangular form is not absolutely essential though desirable as it maintains the valve from any rotative movement. The circular form as shown in Fig. 10 can be used but requires some type of keying means to prevent rotative movement of the valve.

The valve 27 is also rectangular in external form to slidably fit in the upper chamber 24 and has grooves 28 and 29 formed lengthwise in the respective opposite sides and which terminate at the rectangular valve head 30, the lower end terminating in the foot 16. A pin 31 is set through the wall of the housing for cooperation with the underside of the valve head 30 to limit projection of the plunger valve and is secured in place by the encompassing closure 14 which frictionally fits on the upper portion of the housing and seats against the shoulder 19.

A compression spring 32 cooperates between the housing head 20 and the valve head 30, urging projection of the valve stem, and opposed passages 33 and 34 are formed through the wall of the valve housing and are located just above the valve head when in its projected position, and these passages communicate with the respective grooves when the plunger is retracted.

As will be understood, the closure is not limited to a cork as shown, but may be formed of other resilient material, or may be in the form of a screw cap 35 having a cylindrical sleeve 36 to frictionally fit on the upper end of the housing for alignment and to retain the stop pin in position to cooperate with the underside of the valve head, this being the simplest and quickest assembly arrangement.

Since it is possible to vary the elevation of the air lip 22 through excess or lesser degree of insertion of the cork, and since there may be some variation in the distance from the top of the container support indicated at 37, and the bottom 17 of the fountain, and in other cases where adjustment of the air lip may prove desirable, an adjustable air lip is illustrated in Figs. 7, 8 and 9, and is illustrated in the form of a clamp sleeve 38 which is frictionally retained in adjusted position through the resiliency of the sleeve which is divided on one side as indicated at 39, the housing being relieved at the bottom sufficiently to meet any requirement as indicated at 40. Obviously other means of adjustment may be employed though that illustrated is the simplest type and may include a key 41, Fig. 9, to prevent rotation. The water lip 23 must extend at least down to the minimum level which might be required and therefore should be extended sufficiently to compensate for any variations in relative positions of the cooperative members.

As previously mentioned, the valve may have a plurality of grooves or passages for water and air and is shown with four grooves 42, 43, 44 and 45 in Fig. 10, and may be arranged for one or two for air and the others for water, and is illustrated as slidable in a cylindrical chamber 46 in which case some means is required to maintain the plunger against rotative movement and is shown as comprising pins 47 and 48 which are similar to the pin 31 and are also held in place by the closure and also coincidently function as the stop means for cooperation with the underside of the valve head for limiting projection of the valve stem.

To assemble the invention, the spring is dropped into the inverted housing, the valve is inserted and forced inwardly against the urgence of the spring, the pin 31 is dropped into place and the closure is slipped down on the upper end to seat against the shoulder.

For use, the closure is removed from the container and the invention substituted. The container is now sealed as the valve head is below the passage 33 and 34 through urgence of the spring 32. The container is inverted and placed in position on the support at 37, and as it is lowered into position, the foot 16 engages the bottom 17 of the fountain while the barrel is lowered, causing the retraction of the valve to a position just immediately above the passages 33 and 34.

The fountain roll 49 must have a substantially exact degree of immersion for feeding just the correct amount of moisture for the image plate, and this is best accomplished by proper adjustment of the air lip 50 to the maximum permissible level under which conditions the water level will be maintained well within the permissible variation in maximum and minimum levels.

When the respective levels of the container support, insertion of the cork, and of the bottom of the fountain are maintained, the regulator will not require any adjustment and can be formed directly to predetermined measurements for efficient operation.

However, it is known that one type of fountain with fountain roll requires a slightly higher level of water, on the order of 3/32 inch, and for which reason the heel of the foot 16 is provided with a depending bead 51 which is left intact for this particular fountain and broken off for other fountains, thus compensating for all known apparatus of this type, and thereby eliminating the necessity for adjustment in this case. For other conditions, the adjustment illustrated in Figs. 7, 8 and 9 may be desirable or actually necessary.

It will be noted that air and water passages are separate and isolated from each other, the water having direct access below the surface of the water in the fountain at all times and sealed from air, while the air has access above the surface of the water as soon as a gap develops between the lip and the water, and since the water is delivered to the fountain at a level below that of the air intake, there is no possibility of a vapor or air lock, assuring perfection and efficiency in the operation of the press.

I claim:

1. A water fountain regulator for an off-set printing press or the like comprising a housing having a closure to fit a water supply container, a plunger type valve slidable in said housing and terminating at its upper end in a valve head and having grooves formed longitudinally in the sides and terminating at said valve head and comprising air and water passages, the lower end of said plunger valve projecting below the lower end of said housing for cooperation with the bottom of the fountain, means cooperative with said valve head for urging projection of said valve and including stop means for limiting projection to a predetermined degree, and transverse passages formed through the wall of said housing and communicative with the respective grooves for communication when the plunger valve is retracted and being located above said valve head when the plunger valve is projected for sealing the container, with said air and water passages opening to said fountain respectively at maximum and minimum permissible water levels for maintaining a substantially constant level of water in the fountain and to eliminate the possibility of air lock.

2. A regulator for a fountain having a bottom and a water container and a support therefor comprising, a valve housing including a closure located intermediate the height of the valve housing for sealing said container, a valve slidable in said housing and movable to projected and retracted positions, said housing and valve including separate air and water conductors for communication between the interior of the container and the fountain and said valve including closure means for said conductors, said conductors extending to and terminating respectively at maximum permissible water level and slightly below minimum permissible water level for said fountain when said container is supported on said support in inverted position, with the valve in retracted position through cooperation with the bottom of the fountain, and said valve including spring means for projecting said valve for closing said conductors to seal the container for removal or replacement.

3. Water level regulating means for an off-set printing press or the like comprising, a water container, a fountain having a bottom and having a support for the water container in inverted position, a supply of water in said container, a valve housing having a closure intermediate the height thereof for said container, a valve in said housing and movable to two positions including spring means for projecting the valve and including stop means for limiting projection, and retractable through cooperation with the bottom of the fountain, separate air and water conductors in communication between the interior of said container and said fountain through said valve and housing and respectively terminating at the maximum permissible water level and below the minimum permissible water level for said fountain when the inverted container is supported on said support, said valve closing said conductors when the valve is projected, and opening said conductors when the valve is retracted through cooperation with the bottom of the fountain.

4. A structure as defined in claim 3, said separate air and water conductors including valve means on said housing exteriorly of said container and adjustable thereon relative to said maximum and minimum permissible water levels for adjusting the relative water levels at will for developing and maintaining a predetermined level of water in the fountain for most efficient and flawless printing by the off-set press.

5. Water level regulating means for an off-set printing press or the like comprising, a water container, a fountain having a bottom and having a support for the water container in inverted position, a supply of water in said container, a closure for said container, separate water and air conductors in communication with the interior of said container and with said fountain and respectively terminating at the maximum permissible water level and below the minimum permissible water level for said fountain when the inverted container is supported on said support, said air and water conductors comprising a valve housing projecting through said closure, a valve having a stem for cooperation with the bottom of said fountain and having a head and slidable in said housing, and conductive passages formed longitudinally of said stem and terminating at said head, spring means for projecting said stem and including stop means for limiting projection thereof, and passages formed through the wall of said housing for communication with said conductive passages when said valve and stem are retracted through cooperation of the stem with the bottom of the fountain.

6. A water level regulator for the fountain of an off-set printing press or the like and including a fountain having a bottom, and a container support, comprising a container and a supply of water therein, a valve housing having a vented head at one end, a valve having a valve head at one end and having a stem and slidable in said housing with the stem projecting from the other end of said housing for cooperation with the bottom of the fountain, air and water passages formed in the sides and throughout the length of said stem and terminating at said valve head, spring means for urging projection of said valve stem and including stop means for limiting the degree of projection, said valve housing including a closure for said container, passages formed through said valve housing for communication with said air and water passages when said valve is retracted against the urgence of said spring means through cooperation of said stem with the bottom of said fountain and located above said closure for communication with the interior of said container, with said valve closing said container when said stem is free, the other end of said housing being stepped with the respective sides terminating respectively and coincident with maximum permissible level for passage of air to said container, and minimum permissible water level for the fountain for delivery of water from said container when the water level in the fountain drops below said maximum permissible water level.

7. A fountain regulator for an off-set printing press or the like having a fountain having a bottom and a container support and a container for water, comprising a valve housing having a housing head at one end and open at the other end with the respective sides of the other end terminating in different planes for air intake and water delivery, a valve having a valve head and a stem and having air and water grooves formed in respective sides and extending throughout the length of the stem and terminating at the valve head, with said valve head and stem slidable in said housing, a compression spring cooperative between said housing head and said valve head for urging projection of said stem, said stem projecting beyond the said other end of said housing, and means for limiting the degree of projection of said stem, air and water passages provided through the wall of said housing and located above said valve head when said stem is in projected position, and located below said valve head when in retracted position for communication with the respective air and water grooves, and closure means on said housing for sealing the container with said air and water passages located above said closure means for communication with the interior of said container, said valve being retracted through cooperation of the projecting end of said stem with the bottom of the fountain when the container is placed on said support, for maintaining a substantially constant level of water in said fountain.

8. A structure as defined in claim 7, an air lip adjustable on said housing for adjustment to a plane coincident with the maximum permissible level of water in the fountain.

References Cited in the file of this patent

UNITED STATES PATENTS

| | | |
|---|---|---|
| 1,921,105 | Spear | Aug. 8, 1933 |
| 2,637,336 | Emery | May 5, 1953 |